United States Patent [19]
Novak et al.

[11] Patent Number: 5,903,736
[45] Date of Patent: May 11, 1999

[54] METHOD AND APPARATUS FOR SMOOTH INDUCTIVE COMPENSATION OF TRANSMISSION BUS CAPACITIVE PARASITICS

[75] Inventors: Vit Frantisek Novak, Los Altos; Lawrence David Smith, San Jose, both of Calif.

[73] Assignee: Sun Microsystems, Inc., Palo Alto, Calif.

[21] Appl. No.: 08/831,369

[22] Filed: Apr. 1, 1997

[51] Int. Cl.$^6$ .............................. G06F 13/00; H03K 17/16
[52] U.S. Cl. ............................................... 395/280; 326/30
[58] Field of Search ........................ 326/30, 86; 395/309, 395/287, 280, 285, 306

[56] References Cited

U.S. PATENT DOCUMENTS

| | | | |
|---|---|---|---|
| 5,528,167 | 6/1996 | Samela et al. | 326/30 |
| 5,553,250 | 9/1996 | Miyagawa et al. | 395/309 |
| 5,570,037 | 10/1996 | Llorens | 326/30 |

*Primary Examiner*—Glenn A. Auve
*Attorney, Agent, or Firm*—Peninsula Law Group; Daniel Hopen

[57] ABSTRACT

An inductive compensation apparatus for smooth compensation of a transmission bus and methods of operating the same result in improved impedance of the transmission bus for transfer of data signals. The inductive compensation apparatus having an input and an output and a transmission bus with an effective impedance comprises a first capacitance connected to the input and a second capacitance connected to the output. A first bus compensator is connected between the input and the first capacitance to compensate the first capacitance and raise the impedance of the transmission bus. A second bus compensator is connected between the first capacitance and the second capacitance to compensate the first capacitance and the second capacitance and raise the impedance of the transmission bus. A third bus compensator is connected between the second capacitance and the output to compensate the second capacitance and raise the impedance of the transmission bus for improved data transfers on the transmission bus.

20 Claims, 2 Drawing Sheets

METHOD AND APPARATUS FOR SMOOTH INDUCTIVE COMPENSATION OF TRANSMISSION BUS CAPACITIVE PARASITICS

BACKGROUND OF THE INVENTION

1. Field of the Invention

The present invention relates to compensating transmission buses and more particularly to inductive compensation of capacitive parasitics of transmission buses to raise the effective impedance of the transmission buses.

2. Description of the Related Arts

As computer technologies continue to grow by leaps and bounds, users of the computer technologies have an insatiable desire for faster systems with increased storage and retrieval capabilities. To address these desires of the users, faster and more powerful CPUs (central processing units) and larger hard disk drives and multiple disk drive enclosures are constantly being developed.

An interface called SCSI (small computer system interface) is a common interface used to connect and communicate storage devices with a CPU. The SCSI specification enables diverse peripheral devices and one or more computer systems to work together. SCSI devices connect to a computer using a SCSI bus in a daisy chain configuration as opposed to being connected in a parallel configuration. The SCSI bus comprises a multitude of transmission lines for control and data signals. One reason for the SCSI popularity among computer systems is that SCSI is a device independent interface. Each SCSI device masks the internal operation of a peripheral from other peripherals and the computer, even though the SCSI devices are connected to the same transmission bus. The computer CPU does not need to know much about each peripheral in order for the computer to communicate with the peripheral. SCSI peripherals are referred to as a logical units rather than physical or actual units and are treated as storage abstractions. The ability for a computer system to treat SCSI devices in abstract terms makes SCSI a popular physical layer.

In applications of high performance data rate transfers in multiple disk drive enclosures which include dedicated multiple disk drive storage and server applications for computer systems, the SCSI physical layer has its limitations. The limitations stem from the fact that as a SCSI disk drive component is connected to the SCSI bus, the SCSI disk drive introduces parasitic capacitance to each SCSI transmission line of the SCSI bus that the SCSI disk drive is connected. The parasitic capacitance or capacitive loads lower the effective impedance of the SCSI transmission line. If the lowered effective impedance is not compensated, reflections and termination problems from impedance mismatches will cause transmission errors of signals on the SCSI transmission lines, particularly at high performance data rates. Ideally, the impedance of the transmission lines of the SCSI bus should be maintained at or about 90 ohms. Currently, many of the multiple disk drive enclosures limit the number of disk drives within the enclosures connected to the SCSI bus in order to reduce the capacitive loading on the SCSI bus so that the impedance of the transmission lines of the SCSI bus are maintained around the 90 ohms range.

Therefore, it is desirable to provide an apparatus and methods of operating the same which compensate capacitive loading from disk drives connected to a transmission bus so that the number of disk drives in a multiple disk drive enclosure is increased without suffering reflections and termination problems associated with impedance mismatches.

SUMMARY OF THE INVENTION

The present invention provides an apparatus for smooth compensation of transmission buses and methods for operating the same which result in increasing the impedance of the transmission buses for improved data transfers. The novel smooth compensation transmission bus design is based on inductive compensation of capacitance connected to the transmission bus. Thus, according to one aspect of the invention, an inductive compensation apparatus having an input and an output and a transmission bus with an effective impedance, comprises a first capacitance connected to the input and a second capacitance connected to the output. A first bus compensator is connected between the input and the first capacitance to compensate the first capacitance and raise the effective impedance of the transmission bus. A second bus compensator is connected between the first capacitance and the second capacitance to compensate the first capacitance and the second capacitance and raise the effective impedance of the transmission bus. A third bus compensator is connected between the second capacitance and the output to compensate the second capacitance and raise the effective impedance of the transmission bus. Raising the effective impedance of the transmission bus reduces reflection and termination problems associated with data signals on the transmission bus.

According to another aspect of the invention, the first bus compensator, the second bus compensator, and the third bus compensator include a combination of inductors and resistors. The resistors of the first bus compensator, the second bus compensator, and the third bus compensator dampen oscillations on the transmission bus. The inductor compensation of the capacitance causes oscillations and ringing of data signals on the transmission bus. The addition of the resistor in combination with the inductor dampens the transmission bus and reduces the ringing on the transmission bus.

According to another aspect of the invention, the first capacitive load and the second capacitive load include a first SCSI (Small Computer System Interface) disk drive and a second SCSI disk drive, respectively. The first SCSI disk drive includes first SCSI input lines. The first bus compensator includes a plurality of inductor and resistor pairs each connected to a corresponding first SCSI input line for compensating the first SCSI input lines to raise the effective impedance of the first SCSI input lines.

According to yet another aspect of the invention, the first SCSI disk drive includes first SCSI output lines. The second SCSI disk drives includes second SCSI input lines connected to the first SCSI output lines. The second bus compensator includes a plurality of inductor and resistor pairs each connected to a corresponding second SCSI input line for compensating the first SCSI output lines and the second SCSI input lines to raise the effective impedance of the first SCSI output lines and the second SCSI input lines.

According to another aspect of the invention, the second SCSI disk drive includes second SCSI output lines. The third bus compensator includes a plurality of inductor and resistor pairs each connected to a corresponding second SCSI output line for compensating the second SCSI output lines to raise the effective impedance of the second SCSI output lines.

According to yet another aspect of the invention, a bus compensation apparatus having an input and an output and a plurality of capacitive loads connected to a transmission bus with an effective impedance comprises a first lumped capacitance having at least two capacitive loads connected to the input. A second lumped capacitance having at least two capacitive loads is connected to the output. A first bus compensator is connected between the input and the first lumped capacitance. A second bus compensator is connected between the first lumped capacitance and the second lumped capacitance. A third bus compensator is connected between the second lumped capacitance and the output. Lumping the plurality of capacitive loads and compensating the lumped capacitance with the bus compensators reduces the number of passive components required to compensate the transmission bus.

According to another aspect of the invention, the first bus compensator, the second bus compensator, and the third bus compensator each include a combination of inductors and resistors. The combination of the passive components compensates the first lumped capacitance and the second lumped capacitance. The first bus compensator compensates the first lumped capacitance to raise the effective impedance of the transmission bus. The second bus compensator compensates the first lumped capacitance and the second lumped capacitance to raise the effective impedance of the transmission bus. The third bus compensator compensates the second lumped capacitance to raise the effective impedance of the transmission bus.

According to another aspect of the invention, the first capacitive load and the second capacitive load include a first plurality of SCSI (Small Computer System Interface) disk drives and a second plurality of SCSI disk drives, respectively. The first plurality of SCSI disk drives includes first SCSI input lines, and the first bus compensator includes a plurality of inductor and resistor pairs each connected to a corresponding first SCSI input line for compensating the first SCSI input lines. The first plurality of SCSI disk drives includes first SCSI output lines. The second plurality of SCSI disk drives includes second SCSI input lines connected to the first SCSI output lines, and the second bus compensator includes a plurality of inductor and resistor pairs each connected to a corresponding second SCSI input line for compensating the first SCSI output lines and the second SCSI input lines. The second plurality of SCSI disk drives includes second SCSI output lines, and the third bus compensator includes a plurality of inductor and resistor pairs each connected to a corresponding second SCSI output line for compensating the second SCSI output lines.

An apparatus and method for operating a smooth compensation apparatus are provided by compensating between each capacitive load. By compensating the capacitive loads to increase the impedance of the transmission bus, the smooth compensation apparatus affords matched impedance for the capacitive loads on the transmission bus. Reflections and termination problems from mismatches in impedance are controlled for proper signal propagation on the transmission bus. Also, lumping a plurality of capacitances together reduces the number of compensating resistor and inductor pairs. Thus, there are afforded savings of component related resources and space within a multiple disk drive enclosure.

Other aspects and advantages of the present invention can be seen upon review of the figures, the detailed description, and the claims which follow.

DETAILED DESCRIPTION OF THE INVENTION

Figure 1:
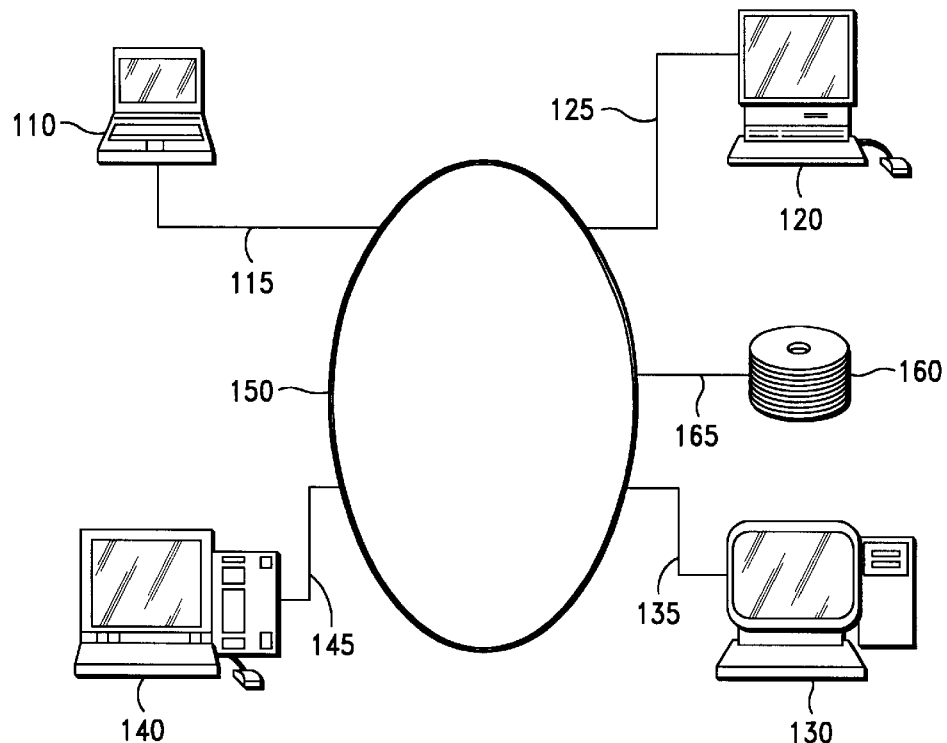
FIG. 1 illustrates a system level block diagram of a computer network having SCSI devices with smooth compensation of SCSI transmission buses in accordance to the present invention.

The invention will be described with respect to the Figures in which FIG. 1 generally shows a system of a computer network 10. Like numeral designations represent like components throughout the description. The computer network 10 includes a client 110, a client 120, a client 130, a client 140, an Internet 150, and a network server 160. The Internet 150 couples the clients 110, 120, 130, and 140 and the network server 160 and provides a medium for communication between the clients and the network server 160. In accordance to the present invention, the Internet 150 provides TCP/IP (Transmission Control Protocol over Internet Protocol). Other represented segments operating the TCP/IP including intranets and local area networks are also suitable.

Referring to FIG. 1, data buses 115, 125, 135, and 145 provide network connections between the clients 110, 120, 130, and 140 and the Internet 150. Data bus 165 provides a network connection between the network server 160 and the Internet 150. The network server 160 includes a plurality of disk drives for storing program instructions and program data for the computer network 10. The clients 110, 120, 130, and 140 include logic circuits that are programmed to perform a series of specifically identified operations for data transfers to and from the Internet 150 and the network server 160. The network server 160 also includes logic circuits that are programmed to perform a series of specifically identified operations for data transfers to and from the Internet 150 and the clients 110, 120, 130, and 140. According to the present invention, the network server 160 includes an apparatus for smooth capacitive compensation of the plurality of disk drives enclosed by the network server. Of course, any client such as client 130 or 140 may also include a plurality of disk drives and the smooth capacitive compensation apparatus according to the present invention for capacitive compensation of the transmission buses of the disk drives.

Figure 2:
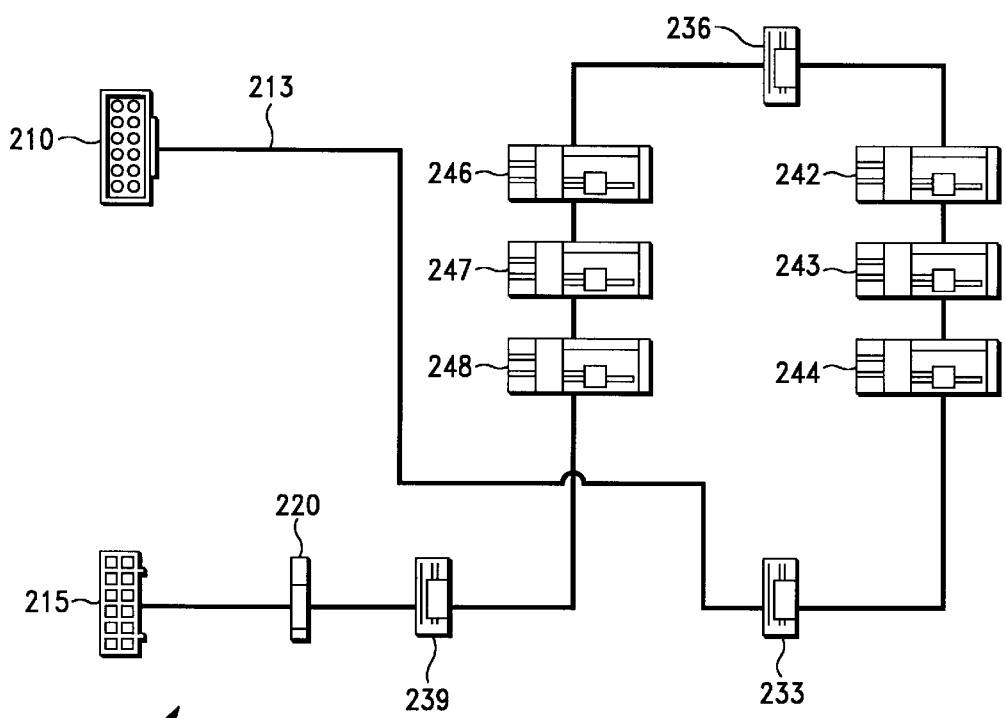
FIG. 2 illustrates a backplane of the network server in accordance to the present invention.

FIG. 2 shows a backplane 260 of the network server 160 in accordance to the present invention. The backplane 260 includes an input connector 210, an output connector 215, a transmission bus 213, a bus terminator 220, bus compensators 233, 236, and 239, and disk drives 242, 243, 244, 246, 247, and 248. The input connector 210 is connected to the transmission bus 213. The transmission bus 213 provides a connection from the input connector 210 to the bus compensator 233, the disk drives 244, 243, 242, the bus compensator 236, the disk drives 246, 247, 248, the bus compensator 239, the bus terminator 220, and the output connector 215.

The input connector 210 and the output connector 215 are multiple pin connectors for coupling to the transmission bus 213. The transmission bus 213 provides a plurality of transmission lines for data and control signals for accessing the disk drives 242, 243, 244, 246, 247, and 248. According to the present invention, the disk drives 242, 243, 244, 246, 247, and 248 are SCSI drives that are daisy chained on the transmission bus 213. The transmission bus 213 has an effective impedance. However, inherent to disk drives connected to a transmission bus, each disk drive connected to a transmission bus introduces a capacitive load to the transmission bus 213 that reduces the impedance of the transmission bus. By placing multiple disk drives at close proximity with each other to lump the capacitive load of each drive into a single lumped capacitance, the bus compensator compensates the lumped capacitance to raise the impedance of the transmission bus.

Referring to FIG. 2, the disk drives 242, 243, and 244 are spaced such that the disk drives 242, 243, and 244 represent a first lumped capacitance. Similarly, the disk drives 246, 247, and 248 are spaced such that the disk drives 246, 247, and 248 represent a second lumped capacitance. In the present invention, the disk drives are placed approximately two inches apart on the backplane 260. The two inch spacing provides access for maintenance of the disk drives while maintaining close proximity between the disk drives for establishing a lumped capacitance. The bus compensators 233, 236, and 239 provide bus compensation to the first lumped capacitance and the second lumped capacitance. The bus compensator 233 compensates the first lumped capacitance from the disk drives 242, 243, and 244. The bus compensator 236 compensates the first lumped capacitance from the disk drives 242, 243, and 244 and the second lumped capacitance from the disk drives 246, 247, and 248. The bus compensator 239 compensates the second lumped capacitance from the disk drives 246, 247, and 248. Alternatively stated in other words, the bus compensator 233 and the bus compensator 236 compensate the first lumped capacitance comprising the disk drives 242, 243, and 244. The bus compensator 236 and the bus compensator 239 compensate the second lumped capacitance comprising the disk drives 246, 247, and 248. The bus terminator 220 terminates the transmission bus 213 at the end of the SCSI chain. The output connector 215 provides a connector interface for the transmission bus 213.

Although FIG. 2 illustrates a backplane assembly having two groups of three disk drives each with a first lumped capacitance and a second lumped capacitance, other combinations having more groups with more or less disk drives and lumped capacitance are equally applicable. For example, there may be three groups of four disk drives for a total of twelve disk drives having a first lumped capacitance, a second lumped capacitance, and a third lumped capacitance. Furthermore, the bus compensators may be attached to the disk drives instead of attaching the bus compensators to the backplane.

Figure 3:
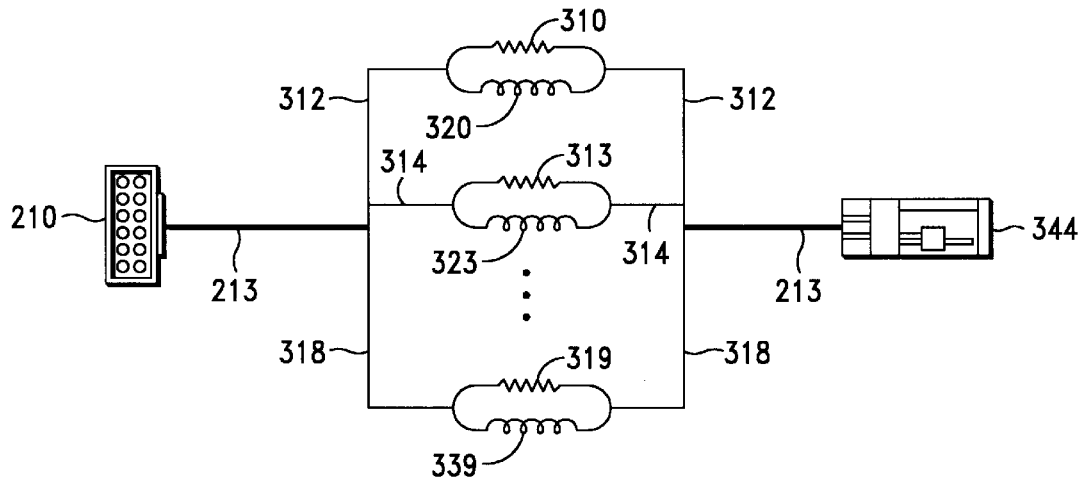
FIG. 3 illustrates a bus compensator connected to an input connector and a disk drive via a transmission bus.

FIG. 3 shows the bus compensator 233 connected to the input connector 210 and a disk drive 344 via the transmission bus 213. The disk drive 344 comprises the disk drives 244, 243, and 242 and represents a lumped capacitance. The transmission bus 213 includes a plurality of transmission lines of which lines 312, 314, and 318 are illustrated. The input connector 210 is connected to the bus compensator 236. The bus compensator 236 includes a plurality of resistor and inductor pairs each connected to the plurality of transmission lines of the transmission bus 213. Resistor 310 and inductor 320 pair is connected to the transmission line 312 of the transmission bus 213. Resistor 313 and inductor 323 pair is connected to the transmission line 314 of the transmission bus 213, and resistor 319 and inductor 339 pair is connected to the transmission line 318 of the transmission bus 213. The bus compensator 236 is connected to the disk drive 344 and compensates the lumped capacitance of the disk drives 244, 243, and 242.

In particular with respect to the lumped capacitance of the disk drives 244, 243, and 242 connected to transmission line 318, the inductor 339 compensates the lumped capacitance on transmission line 318 from the disk drives 244, 243, and 242 and raises the effective impedance of the transmission line 318. Raising the effective impedance of the transmission line 318 reduces reflection and termination problems associated with data signals on the transmission line. The resistor 319 dampens oscillation from the inductor and capacitor combination.

A equivalent circuit model for the transmission line 318 provides a string of "T" connected inductors and parallel capacitors. Each parallel capacitor represents a lumped capacitance from a group of disk drives. The impedance (Z) of the transmission line is $\sqrt{L/C}$ where L is the inductance and C is the capacitance of the "T" connected inductor and capacitor for the equivalent circuit model. Each additional disk drive introduces a capacitive component that effectively lowers the transmission line impedance by increasing C without a matching increase in L. Ascertaining the capacitance of the particular disk drives connected to the transmission bus, the impedance formula calculates an inductance value to compensate the transmission bus for the desired impedance. The present invention provides a desired effective impedance for the transmission bus to be about 90 Ohms and disk drives having 12 pF (pico-Farads) capacitance result in an inductance value of about 120 nH (nano-Henrys).

In operation, the combination of the inductance and capacitance resonates and produces oscillations on the inductive compensated transmission line. To dampen the oscillations, a resistor is placed in parallel with the inductor. Thus, the bus compensator 233 for transmission line 318 includes the resistor 319 and inductor 339. Similarly, the bus compensator 233 for transmission line 312 includes the resistor 310 and the inductor 320, and the bus compensator 233 for transmission line 314 include the resistor 313 and the inductor 323.

Figure 4:
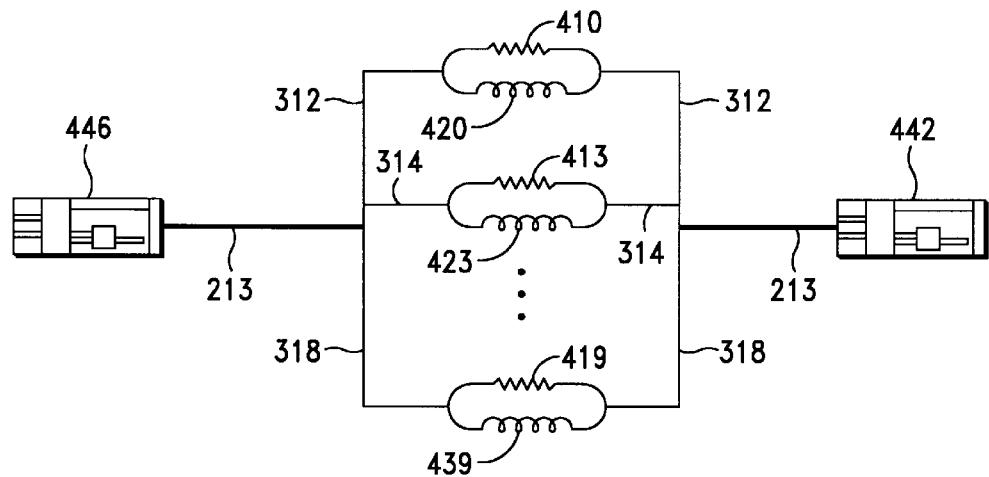
FIG. 4 illustrates a bus compensator connected to a first disk drive and a second disk drive via a transmission bus.

FIG. 4 shows the bus compensator 236 connected to the disk drive 446 and the disk drive 442 via the transmission bus 213. The disk drive 446 comprises the disk drives 246, 247, and 248 and represents a first lumped capacitance, and the disk drive 442 comprises the disk drives 242, 243, and 244 and represents a second lumped capacitance. The transmission bus 213 includes a plurality of transmission lines of which lines 312, 314, and 318 are illustrated. The disk drive 446 is connected to the bus compensator 236. The bus compensator 236 includes a plurality of resistor and inductor pairs each connected to the plurality of transmission lines of the transmission bus 213. Resistor 410 and inductor 420 pair is connected to the transmission line 312 of the transmission bus 213. Resistor 413 and inductor 423 pair is connected to the transmission line 314 of the transmission bus 213, and resistor 419 and inductor 439 pair is connected to the transmission line 318 of the transmission bus 213. The bus compensator 236 compensates the first lumped capacitance of disk drive 446 comprising the disk drives 246, 247, and 248 and the second lumped capacitance of disk drive 442 comprising the disk drives 244, 243, and 242.

The resistor values and inductor values of the bus compensator 236 are approximately twice the resistor values and inductor values of the bus compensator 233. The bus compensator 236 compensates two lumped capacitance comprising the disk drives 242, 243, and 244 and the disk drives 246, 247, and 248 while the bus compensator 233 compensates a single lumped capacitance comprising the disk drives 244, 243, and 242. Also, the resistor values and inductor values of the bus compensator 239 is of similar values to the bus compensator 233 because the bus compensator 239 compensates a single lumped capacitance comprising the disk drives 248, 247, and 246.

Figure 5:
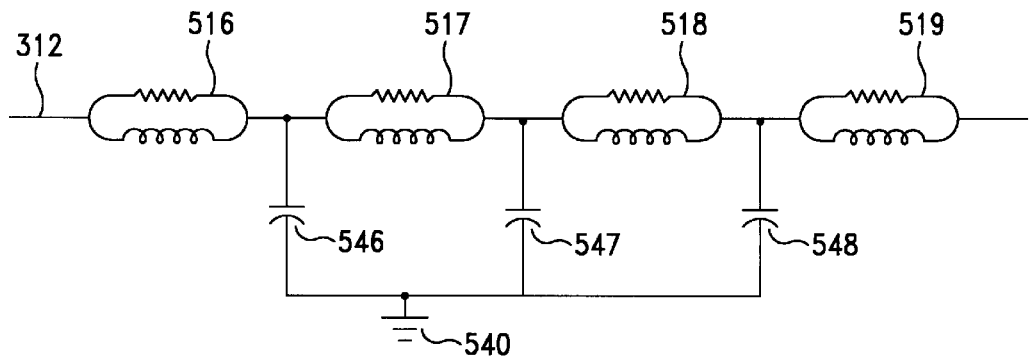
FIG. 5 illustrates an alternative embodiment of individual inductive compensation of capacitances connected to transmission lines

FIG. 5 shows an alternative embodiment of smooth inductive compensation of transmission lines. Parasitic capacitance of the capacitive loads 546, 547, and 548 represent the equivalent circuit of the disk drives 246, 247, and 248 respectively, attached to the transmission line 312 of the transmission bus 213. The capacitive loads 546, 547, and 548 are connected between the transmission line 312 and ground 540. Resistor and inductor pair 516 and resistor and inductor pair 517 compensate the capacitive load 546. Similarly, the resistor and inductor pair 517 and resistor and inductor pair 518 compensate the capacitive load 547, and the resistor and inductor pair 518 and resistor and inductor 519 compensate the capacitive load 548. Compensating each capacitive load with a resistor and inductor pair affords improved inductive compensation of the transmission lines.

However, given the number of transmission lines available for a typical transmission bus, the sheer number of components which provides the inductive compensation may be impractical in certain circumstances to compensate between each disk drive component. For instance, a standard SCSI cable has 50 transmission lines. Referring to FIG. 5, individual compensation between each of the three disk drives requires four resistor and inductor pairs for every transmission line of the standard SCSI cable. Each transmission line requires eight components for individual compensation. Multiplying eight components by 50 lines results in 400 compensating components: 200 resistors and 200 inductors. Although not all of the available 50 transmission lines carry data signals and require inductive compensation, the present invention utilizes 27 of the 50 available transmission lines: 16 data lines, two parity lines, and 9 control lines. Moreover, other SCSI physical layers such as SCSI-2 Fast and Wide and SCSI-3 have 68 transmission lines available. Thus, as many as 544 compensating components are used for individual inductive compensation of three disk drives.

The alternative embodiment of lumping a plurality of capacitance into a single capacitance reduces the number of components used to compensate a transmission bus. Because of the many transmission lines associated with a SCSI bus, and that each transmission line uses a resistor and an inductor pair for inductive compensation, an enormous number of resistor and inductor pairs are used to compensate the lines between each drive. The present invention provides as many as 15 disk drives and 27 lines for the SCSI bus. Thus, a tremendous number of the resistor and inductor pairs along with real estate space on the backplane of a multiple disk drive enclosure assembly is saved by lumping the capacitance of the disk drives and compensating the lumped capacitance.

While the foregoing detailed description has described embodiments of the apparatus and methods for smooth compensating of transmission buses in accordance with this invention, it is to be understood that the above description is illustrative only and not limiting of the disclosed invention. Obviously, many modifications and variations will be apparent to the practitioners skilled in this art. Accordingly, the apparatus and methods for smooth compensating of transmission buses have been provided. Compensating between each individual capacitance affords improved inductive compensation of the data bus but lumping the individual capacitance of the transmission bus to provide a lumped capacitance reduces the number of components used to provide the inductive compensation.

What is claimed is:

1. An inductive compensation apparatus having an input and an output and a transmission bus with an effective impedance, comprising:

a first capacitance connected to the input;

a second capacitance connected to the output;

a first bus compensator connected between the input and the first capacitance to compensate the first capacitance and raise the effective impedance of the transmission bus;

a second bus compensator connected between the first capacitance and the second capacitance to compensate the first capacitance and the second capacitance and raise the effective impedance of the transmission bus; and a third bus compensator connected between the second capacitance and the output to compensate the second capacitance and raise the effective impedance of the transmission bus.

2. The inductive compensation apparatus of claim 1, wherein the first bus compensator, the second bus compensator, and the third bus compensator include a combination of inductors and resistors.

3. The inductive compensation apparatus of claim 2, wherein the resistors of the first bus compensator, the second bus compensator, and the third bus compensator dampen oscillations on the transmission bus.

4. The inductive compensation apparatus of claim 1, wherein the first capacitive load and the second capacitive load include a first SCSI (Small Computer System Interface) disk drive and a second SCSI disk drive, respectively.

5. The inductive compensation apparatus of claim 4 wherein:

the first SCSI disk drive includes first SCSI input lines; and the first bus compensator includes a plurality of inductor and resistor pairs each connected to a corresponding first SCSI input line for compensating the first SCSI input lines.

6. The inductive compensation apparatus of claim 4 wherein:

the first SCSI disk drive includes first SCSI output lines;

the second SCSI disk drives includes second SCSI input lines connected to the first SCSI output lines; and the second bus compensator includes a plurality of inductor and resistor pairs each connected to a corresponding second SCSI input line for compensating the first SCSI output lines and the second SCSI input lines.

7. The inductive compensation apparatus of claim 4 wherein:

the second SCSI disk drive includes second SCSI output lines; and the third bus compensator includes a plurality of inductor and resistor pairs each connected to a corresponding second SCSI output line for compensating the second SCSI output lines.

8. A bus compensation apparatus having an input and an output and a plurality of capacitive loads connected to a transmission bus with an effective impedance, comprising:

a first lumped capacitance having at least two capacitive loads connected to the input;

a second lumped capacitance having at least two capacitive loads connected to the output;

a first bus compensator connected between the input and the first lumped capacitance;

a second bus compensator connected between the first lumped capacitance and the second lumped capacitance; and a third bus compensator connected between the second lumped capacitance and the output.

9. The bus compensation apparatus of claim 8, wherein the first bus compensator, the second bus compensator, and the third bus compensator each include a combination of inductors and resistors.

10. The bus compensation apparatus of claim 8, wherein the first bus compensator compensates the first lumped capacitance to raise the effective impedance of the transmission bus.

11. The bus compensation apparatus of claim 8, wherein the second bus compensator compensates the first lumped capacitance and the second lumped capacitance to raise the effective impedance of the transmission bus.

12. The bus compensation apparatus of claim 8, wherein the third bus compensator compensates the second lumped capacitance to raise the effective impedance of the transmission bus.

13. The bus compensation apparatus of claim 8, wherein the first capacitive load and the second capacitive load include a first plurality of SCSI (Small Computer System Interface) disk drives and a second plurality of SCSI disk drives, respectively.

14. The bus compensation apparatus of claim 13 wherein:
the first plurality of SCSI disk drives includes first SCSI input lines; and
the first bus compensator includes a plurality of inductor and resistor pairs each connected to a corresponding first SCSI input line for compensating the first SCSI input lines.

15. The bus compensation apparatus of claim 13 wherein:
the first plurality of SCSI disk drives includes first SCSI output lines;
the second plurality of SCSI disk drives includes second SCSI input lines connected to the first SCSI output lines; and
the second bus compensator includes a plurality of inductor and resistor pairs each connected to a corresponding second SCSI input line for compensating the first SCSI output lines and the second SCSI input lines.

16. The bus compensation apparatus of claim 13 wherein:
the second plurality of SCSI disk drives includes second SCSI output lines; and
the third bus compensator includes a plurality of inductor and resistor pairs each connected to a corresponding second SCSI output line for compensating the second SCSI output lines.

17. A computer system having bus compensation for a plurality of disk drives, comprising:
a memory configured to store program instructions and data;

a CPU (central processing unit) connected to the memory configured to process data in response to program instructions;
a first set of disk drive having at least two disk drives connected to the CPU configured to store first programs and first program data;
a second set of disk drive having at least two disk drives connected to the first set of disk drives and the CPU configured to store second programs and second program data;
a first bus compensator connected between the CPU and the first set of disk drives;
a second bus compensator connected between the first set of disk drives and the second set of disk drives; and
a third bus compensator connected between the second set of disk drives and the CPU.

18. The computer system of claim 17 further comprising a first transmission bus having an impedance connected between the CPU and the first set of disk drives and wherein:
the first set of disk drives includes a first lumped capacitance; and
the first bus compensator includes a combination of inductor and resistor pairs configured to compensate the first lumped capacitance and raise the impedance of the first transmission bus.

19. The computer system apparatus of claim 17 further comprising a second transmission bus having an impedance connected between the first set of disk drives and the second set of disk drives and wherein:
the first set of disk drives includes a first lumped capacitance;
the second set of disk drives includes a second lumped capacitance; and
the second bus compensator includes a combination of inductor and resistor pairs configured to compensate the first lumped capacitance and the second lumped capacitance and raise the impedance of the second transmission bus.

20. The computer system apparatus of claim 17 further comprising a third transmission bus having an impedance connected between the second set of disk drives and the CPU wherein:
the second set of disk drives includes a second lumped capacitance; and
the third bus compensator includes a combination of inductor and resistor pairs configured to compensate the second lumped capacitance and raise the impedance of the third transmission bus.

* * * * *